Feb. 13, 1951

C. J. DODSON 2,541,641

ADJUSTABLE BUBBLE LEVEL

Filed Feb. 9, 1946

Claude J. Dodson  Inventor

By Edwin C. Woodhouse
Attorney

Claude J. Dodson, Inventor

By Edwin C. Woodhouse, Attorney

Feb. 13, 1951            C. J. DODSON            2,541,641
ADJUSTABLE BUBBLE LEVEL

Filed Feb. 9, 1946            3 Sheets-Sheet 3

Claude J. Dodson, Inventor

By Edwin C. Woodhouse
           Attorney

Patented Feb. 13, 1951

2,541,641

UNITED STATES PATENT OFFICE 2,541,641

ADJUSTABLE BUBBLE LEVEL

Claude J. Dodson, Martinsville, Va.

Application February 9, 1946, Serial No. 646,581

4 Claims. (Cl. 33—213)

This invention relates to levels, and particularly to levels for checking rotatable machine elements.

It is an object of the present invention to provide a novel and accurate level for checking rotatable machine elements such as shafts, pulleys, fly wheels, fan rotors, gears and the like, and apparatus containing the same such as pumps, turbines, line shafts, motors, gas engines, compressors, etc. A particular object is to provide a level of such character by which it is possible to accurately measure the out of level position of such machine elements even though they involve bent shafts, distorted couplings, bent or broken fly wheels or pulleys, worn-out fan rotors, or vertical shafting, and even though they are damaged by rust or tool marks. A further object is to provide an improved method for measuring the level of a rotatable machine element. Other objects are to advance the art. Still other objects will appear hereinafter.

Some of the objects of my invention may be accomplished by the provision of a level comprising a base member adapted to fit over a machine element in a plane perpendicular to the axis of the machine element, means for detachably fastening the base member to the machine element, a level vial, a vial yoke for supporting the vial, yoke supporting means extending vertically from the base member and supporting the vial yoke in spaced position from the base member for adjusted rotation about a vertical axis and adjusted rotation about a horizontal axis, and means for securing the vial yoke in its adjusted positions. Other objects may be accomplished by measuring the level of a machine element by rotating the level about the axis of the machine element.

My invention will be best understood from the following description when taken with the accompanying drawings, in which.

Figure 2:
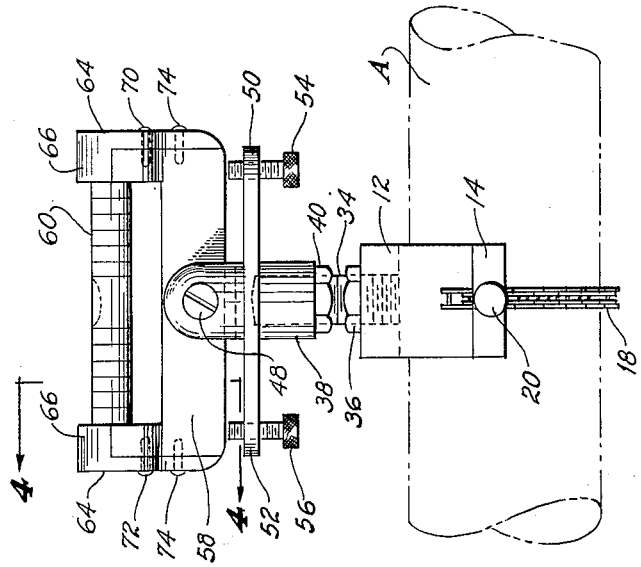
Fig. 2 is a side view of the level of Fig. 1, looking from the left.

Referring particularly to Figs. 1 to 4, the base member 12 is in the form of an inverted V-block which is adapted to straddle and fit over the rotatable machine element A in a plane substantially perpendicular to the axis of the machine element. The lower end of one of the legs is provided with a horizontally extending foot 14 provided with an aperture 16 through which there may be threaded one end of a long, narrow, flexible fastening member, such as a chain 18 having open links adapted to fit over a pin 20. The foot 14 is provided with a hole 22 extending inwardly from the end in a horizontal direction and having its center intersecting the center of the aperture 16 and extending beyond the aperture 16. The hole 22 is threaded at its outer end to receive the threaded portion of the pin 20, the unthreaded portion of which extends through a link of the chain 18 through the aperture 16, and into the inner end of the hole 22.

The end of the other leg of the base member 12 is provided with a bifurcated foot 24 extending outwardly from the leg. The bifurcated foot is adapted to receive a longitudinally adjustable rod or bolt 26 which extends upwardly through the bifurcation. The lower end of the bolt 26 is secured to the end of the chain 18. The upper surface of the bifurcated foot 24 is concaved to form a bearing for the rocking washer 28 fitting over the bolt 26. A nut 30 is provided on the end of the bolt above the rocking washer 28 for adjusting the position of the bolt and tightening the chain about the machine element.

The peak of the base member 12 is provided with a vertically extending threaded aperture 32 adapted to receive the lower threaded end of a vertical post 34. A locknut 36 is provided for locking the post in screwed position in the base member. The upper end of the post 34 is also threaded so that there may be screwed thereon a yoke support 38. A locknut 40 is provided for locking the yoke support in screwed position.

The yoke support 38 is provided at its lower portion with a screw threaded opening 42 to fit over the end of the post 34. The upper portion of the yoke support is slotted to receive a vial yoke 58. Extending through the upper end of the yoke support, in a horizontal direction perpendicular to the slot, is a hole 46 adapted to receive a pivot screw 48 threaded on its end only. The hole 46 is threaded in only that portion which lies on the side of the slot which is adapted to receive the end of the pivot screw. The yoke support is provided with two horizontal oppositely extending wings 50 and 52 spaced a substantial distance below the vial yoke 58. The wing 50 is provided at its end with a vertically extending adjusting screw 54. The wing 52 is similarly provided with an adjusting screw 56. These adjusting screws 54 and 56 are so positioned that they are under the vial yoke 58 and so that their ends can be brought into contact with the under surface of the vial yoke to adjust the position of the vial yoke about the axis of the pivot screw 48.

The vial yoke 58 is substantially U-shaped and is provided at the center of its base with a hole to receive the pivot screw 48. The inner surfaces of the upwardly extending legs of the yoke are spaced apart by a distance slightly less than the length of the level vial 60. The legs are sufficiently thick so that the outer surfaces thereof are spaced apart by a distance slightly greater than the length of the vial. Each leg is provided at its upper end with a horizontal semi-circular vial receiving groove 62, preferably having a radius slightly greater than that of the vial so that a suitable shock-absorbing padding material may be interposed between the metal of the yoke and the surface of the vial. A cap 64 is provided to fit over the outer surface and upper end of each leg of the vial yoke. Each cap is provided with a projection 66 at its upper end which extends inwardly over the end of the leg and which is provided in its under side with a semi-circular vial receiving groove 68 matching that in the upper end of the leg. Each cap is detachably fastened to the vial yoke by means of screws 70, 72 and 74.

Figure 1:
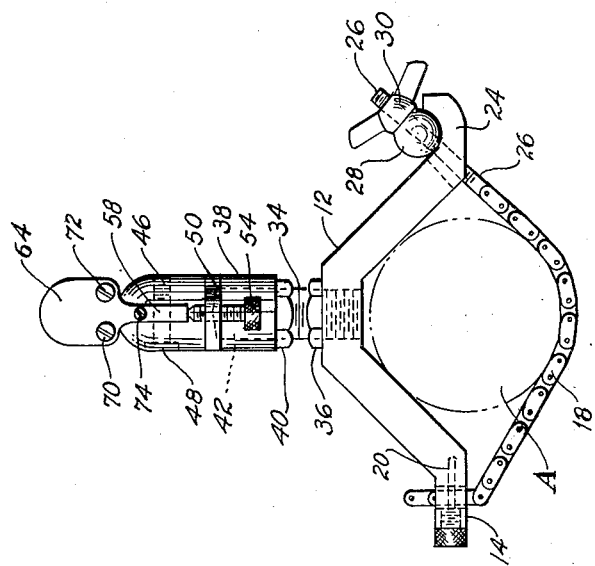
Fig. 1 is an end view showing a preferred modification of the level of my invention mounted in position on a rotatable shaft.
Figure 3:
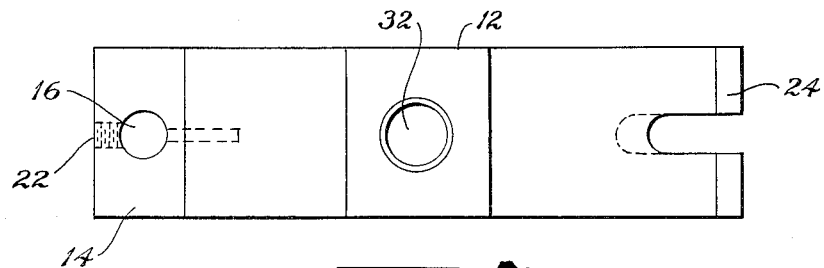
Fig. 3 is a plan view of the base member.
Figure 4:
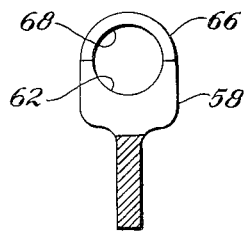
Fig. 4 is a sectional view of the vial yoke, taken on line 4—4 of Fig. 2.

The level, as above described, is particularly adapted for determining the level position of a rotatable machine element whose axis is in a substantially horizontal plane. In the preferred use, the base member 12 is placed over the machine element A as shown in Fig. 1, the bolt 26 is placed in the bifurcated foot 24, and the chain 18 passed under the machine element and up through the aperture 16 until the chain fits snugly against the lower surface of the machine element. The pin 20 is then inserted to secure such end of the chain. The nut 30 is then tightened to tighten the chain and secure the base member to the machine element so that the level will rotate about the axis of the machine element when the machine element is rotated. The locknut 36 is loosened and the post 34 turned until the axis of the vial is in the vertical plane of the axis of the machine element, whereupon the locknut 36 is tightened to secure the post in adjusted position. The adjustment of the vial into the vertical plane of the axis of the machine element may also be accomplished by rotating the vial support 38 on the post and securing it in adjusted position by locknut 40.

The pivot screw 48 is loosened so that the vial yoke may be rotated about it. Screws 54 and 56 are adjusted to bring the vial into position where the bubble will read level. The pivot screw 48 is then tightened to draw the two upper parts of the yoke support together and lock the vial yoke in its adjusted position. The machine element is then rotated 180 degrees, carrying the level with it so that the level will be rotated 180 degrees about the axis of the machine element and brought into upsidedown position. The graduations on the vial extend completely around it so that the vial can be read in any position. With the level in this position, the reading on the vial will be twice the amount that the machine element is out of level. This method of employing the level for measuring the position of the machine element is the preferred method and gives the most accurate measurement.

In adjusting the vial into the vertical plane of the axis of the machine element, the most accurate results can be obtained by placing the level on the machine element as hereinbefore described, then rotating the machine element 90 degrees so that the level lies in a horizontal plane, and adjusting the vial about the axis of the post until it reads level. The machine element is then rotated 180 degrees so that the level lies in a horizontal plane on the other side of the machine element and the level is then read. If the vial does not then read level, it should be adjusted to one-half the amount by which it reads out of level. In this way, the axis of the vial is most accurately adjusted into the vertical plane of the axis of the machine element. The machine element is then rotated to where the level is in vertical position and the vial again adjusted, if necessary, to read level. The measurement of the level position of the machine element will then proceed, as before, by rotating it 180 degrees.

Figures 5, 6:
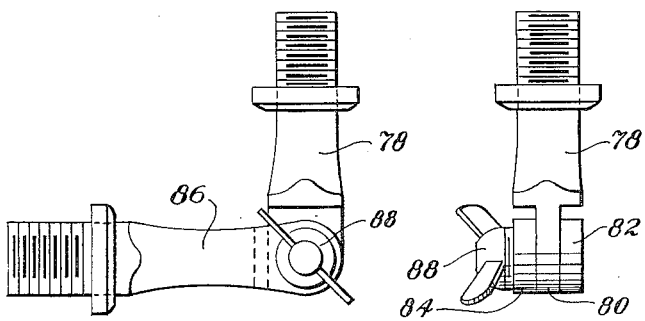
Fig. 5 is an end view of a right angle post for use in measuring the level position of a vertical shaft.
Fig. 6 is a side view of the right angle post of Fig. 5, looking from the left.

When it is desired to measure the plumb position of a vertical shaft, a right angle post, such as that shown in Figs. 5 and 6, is preferably substituted for the post 34. This right angle post comprises a vertical arm 78 screw threaded on the upper end to receive the yoke support. The lower end of arm 78 is provided with a thin flat portion 80 adapted to fit between the ends 82 and 84 of a slotted horizontal arm 86 threaded at its other end so that it may be screwed into the base member 12. The ends 82 and 84 are provided with openings for receiving a pivot screw 88, screw threaded at the end to be screwed into the threaded hole in the end 82 for locking the two arms in adjusted position. The arms 78 and 86 may be adjusted in any angular position desired and may even be brought into alignment for use on a horizontal machine element, if desired.

When the machine element to be checked has its axis extending substantially vertically, the right angle post 78—86 is substituted for the post 34 and the base member 12 is secured to the machine element in a plane substantially perpendicular to the axis of the machine element. Post arm 78 is then adjusted into substantially vertical position and locked in that position. The vial support is then adjusted on the arm 78 so that the axis of the vial is perpendicular to the axis of the machine element and is locked in that position. The vial yoke is then adjusted about its horizontal axis by screws 54 and 56 so that the vial reads level, and locked in such position. The machine element and the level are then rotated slowly about the axis of the machine element through an angle of 360 degrees. The action of the bubble in the vial will register the exact direction that the machine element is out of plumb. Adjustment of the machine element may then be made to bring it into plumb position, repeating the procedure as may be necessary. When the vial shows no change in reading as the machine element is rotated, the machine element is in plumb position.

Figure 7:
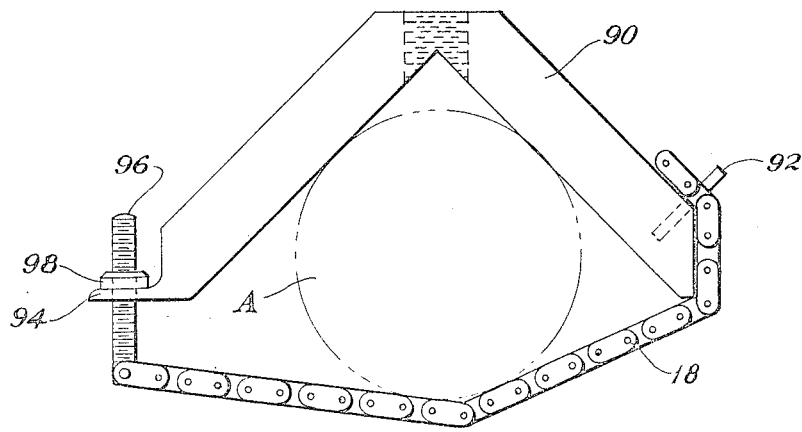
Fig. 7 is an end view of a modified form of base member.

The design and structure of the various parts of the level may be widely varied. Some of such variations are shown in Figs. 7 to 10. In Fig. 7, the base member is in the form of a narrower V-block 90. One of the lower ends of the base member is provided with a pin 92 adapted to fit in the links of the chain 18. The other end of the V-block is provided with a horizontally extending foot 94 provided with an opening to receive a vertically extending bolt 96, the vertical position of which is adjusted by the nut 98.

Figure 8:
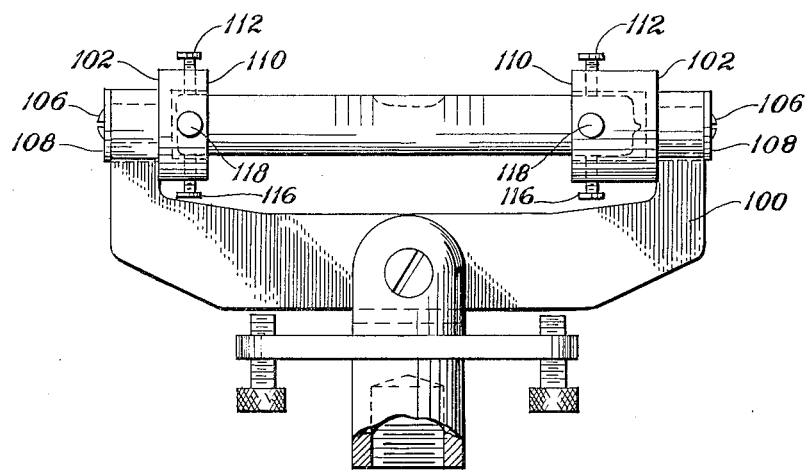
Fig. 8 is a view of a modified form of vial yoke, and support therefor.
Figure 9:
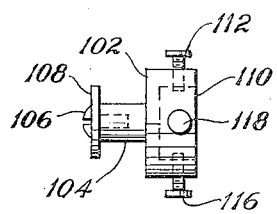
Fig. 9 is a side view of a vial supporting member for use in the vial yoke of Fig. 8.
Figure 10:
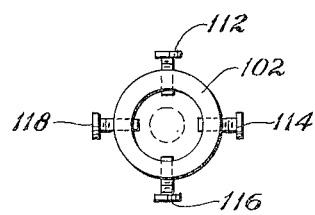
Fig. 10 is an end view of the vial supporting member of Fig. 9, looking from the left.

In Fig. 8, the yoke 100 is wider and each leg is provided with an opening to form a bearing for a rotatable vial supporting member 102 shown in detail in Figs. 9 and 10. Each vial support is provided with a shaft portion 104 provided at its end with a screw 106 and washer 108 for fastening the vial support in the leg of the yoke. The other end of the vial support comprises an enlarged cupped portion 110 adapted to receive the end of a vial. Screws 112, 114, 116 and 118 are provided for centering the vial in the vial support and firmly holding it therein.

The yoke and vial supports shown by Figs. 8 to 10 are particularly adapted for use with a vial containing graduations on only one side. When the level is in such position that the graduations are not on top of the vial, the vial supports may be rotated in the yoke so as to bring the graduations into top position on the vial.

It will be apparent that the yokes, yoke supports, posts and base members may be made of various designs other than those specifically shown and described. Also, the means for adjusting and locking the various parts in adjusted positions may be widely varied. For example, set screws may be provided in the base member and yoke support in place of the locknuts and the threads omitted from the post, base member and yoke support. Particularly, the base members may be designed to fit particular types of machine elements, if desired. A number of different base members of different sizes and designs may be provided to fit machine elements of particular ranges of diameter and designs. The level may be made in various sizes for various sizes of machine elements.

The various parts may be made of any suitable structural material having the desired strength and rigidity. They will usually be made of metal, such as steel, stainless steel, aluminum, aluminum alloys, brass, bronze, etc. The chain may be replaced by a strap of leather, steel or the like, with a series of spaced apertures for the pins or other adjusting means.

In use, the level will preferably be employed in accordance with the methods hereinbefore described, that is, by rotating it about the axis of the machine element. Thereby, the reading will be twice as accurate as was heretofore possible. Also, by such methods, the effects of abnormalities, such as bends in shafts and wheels, distorted couplings, breaks in wheels and pulleys, worn spots, rust, tool marks, etc., are largely eliminated.

The level may be employed in other ways than those described. For example, the level may be adjusted to a machine element which is known to be in proper level or plumb position, and adjusted so that the vial reads level. With the various parts in locked position, the level may then be applied to a machine element to be checked, and the out of level or plumb position then read from the vial.

If the alignment of two elements is to be checked, the level may be applied to one and adjusted as desired, and then applied to the other machine element, whereupon a similar reading will indicate that the parts are in alignment and a different reading will indicate that they are out of alignment and show the degree by which they are out of alignment. Still other methods of using my novel level will become apparent to those skilled in the art with experience in its use.

I claim:

1. A level for rotatable machine elements comprising a base member adapted to fit over the machine element in a plane perpendicular to the axis of the machine element, means for detachably fastening the base member to the machine element, a post extending vertically from the base member and having its lower end screwed into the base member, locking means for securing the post in screwed position, a yoke support screwed onto the upper end of the post, locking means for securing the yoke support in screwed position, a U-shaped vial yoke supported in the yoke support for rotation about a horizontal axis at the center of the base of the yoke, locking means for securing the yoke in rotated position, rigid wings extending horizontally from each side of the yoke support beneath and spaced from the bottom of the yoke for substantially the length of the yoke, two vertical adjusting screws each threaded through the end of a wing and having its upper end adapted to engage the lower surface of the base of the yoke for adjusting the position of the yoke about its horizontal axis, and means for supporting a level vial between the ends of the yoke.

2. A level for rotatable machine elements comprising a base member in the form of an inverted V-block adapted to fit over the machine element in a plane perpendicular to the axis of the machine element and having a pin in one of its lower ends and an apertured horizontally extending foot on its other lower end, means for detachably fastening the base member to the machine element including a long narrow flexible member passing under the machine element and having at least one aperture in one end adapted to fit over the pin and having the other end secured to the lower end of a bolt which passes upward through the aperture in the lower end of the base member, and means at the upper end of the bolt for adjusting the vertical position of the bolt and tightening the flexible member about the machine element, a vial yoke, yoke supporting means extending vertically from the base member and supporting the yoke in spaced position from the base member for adjusted rotation about a vertical axis and adjusted rotation about a horizontal axis, means for securing the yoke in adjusted position about its vertical axis, and means for securing the yoke in adjusted position about its horizontal axis.

3. In a level, a vial, a vial yoke comprising a U-shaped body portion having the inner surfaces of its legs spaced apart by a distance slightly less than the length of the vial, the legs being sufficiently thick so that the outer surfaces are spaced apart by a distance slightly greater than the length of the vial and the upper end of each leg being provided with a semi-circular vial receiving groove having a radius slightly greater than that of the vial, a removable cap for each leg, each cap having a lateral projection at its upper end extending inwardly over the end of the leg and provided in its under side with a semi-circular groove matching that in the upper end of the leg, means for removably securing each cap to the outer surface of a leg of the yoke, and cushioning material surrounding each end of the vial between the vial and the yoke.

4. A level for rotatable machine elements comprising a base member adapted to fit over the machine element in a plane perpendicular to the axis of the machine element, means for detachably fastening the base member to the machine element, a vial, a U-shaped vial yoke, yoke supporting means extending vertically from the base member and supporting the yoke in spaced position from the base member for adjusted rotation about a vertical axis and adjusted rotation about a horizontal axis at the center of the base of the yoke, means for securing the yoke in adjusted position about its vertical axis, means for securing the yoke in adjusted position about its horizontal axis, the vial yoke comprising a U-shaped body portion having the inner surfaces of its legs spaced apart by a distance slightly less than the length of the vial, the legs being sufficiently thick so that the outer surfaces are spaced apart by a distance slightly greater than the length of the vial and the upper end of each leg being provided with a semi-circular vial receiving groove having a radius slightly greater than that of the vial, a removable cap for each leg, each cap having a lateral projection at its upper end extending inwardly over the end of the leg and provided in its under side with a semi-circular groove matching that in the upper end of the leg, means for removably securing each cap to the outer surface of a leg of the yoke, and cushioning material surrounding each end of the vial between the vial and the yoke.

CLAUDE J. DODSON.

REFERENCES CITED

The following references are of record in the file of this patent:

UNITED STATES PATENTS

| Number | Name | Date |
|---|---|---|
| 135,812 | Hutchins | Feb. 11, 1873 |
| 784,511 | Belyen | Mar. 7, 1902 |
| 1,047,220 | Heinrich | Dec. 17, 1912 |
| 1,439,276 | Teeter | Dec. 19, 1922 |
| 1,670,349 | Hain | May 22, 1928 |
| 1,686,318 | Gallasch | Oct. 2, 1928 |
| 2,074,108 | Graham | Mar. 16, 1937 |
| 2,379,591 | Parisi | July 3, 1945 |

FOREIGN PATENTS

| Number | Country | Date |
|---|---|---|
| 20,928 | Great Britain | 1907 |

OTHER REFERENCES

Tracy, Textbook on "Plane Surveying," 1913, page 583.